United States Patent
Wang

(10) Patent No.: US 8,453,297 B2
(45) Date of Patent: Jun. 4, 2013

(54) ELECTRONIC DEVICE AND HANDLE STRUCTURE THEREOF

(75) Inventor: Chih-Yi Wang, Taipei Hsien (TW)

(73) Assignee: Wistron Corp., New Taipei (TW)

( * ) Notice: Subject to any disclaimer, the term of this patent is extended or adjusted under 35 U.S.C. 154(b) by 432 days.

(21) Appl. No.: 12/550,059

(22) Filed: Aug. 28, 2009

(65) Prior Publication Data
US 2010/0301717 A1 Dec. 2, 2010

(30) Foreign Application Priority Data

Jun. 2, 2009 (TW) .............................. 98118144 A

(51) Int. Cl.
*A47B 95/02* (2006.01)
*A45C 13/22* (2006.01)

(52) U.S. Cl.
CPC ..................................... *A45C 13/22* (2013.01)
USPC ............. 16/114.1; 16/405; 190/115; 220/752

(58) Field of Classification Search
CPC .................................. A45C 13/22; A45C 13/26
USPC ............. 16/110.1, 114.1, 405, 408, 444, 445, 16/113.1, 410; 312/223.1; 361/679.59; 190/115, 117, 118, 119, 121; 220/762, 763, 220/768, 769, 770, 752, 755, 757, 761; 206/595, 598, 510
See application file for complete search history.

(56) References Cited

U.S. PATENT DOCUMENTS

| | | | | |
|---|---|---|---|---|
| 1,538,320 A | * | 5/1925 | Gullong | 40/663 |
| 3,113,651 A | * | 12/1963 | Szabo et al. | 16/405 |
| 3,340,970 A | * | 9/1967 | Szabo | 190/115 |
| 3,583,736 A | * | 6/1971 | Willimzik | 292/16 |
| 4,095,711 A | * | 6/1978 | Conley | 220/766 |
| 4,733,549 A | * | 3/1988 | Baker | 70/68 |
| 4,895,231 A | * | 1/1990 | Yamaguchi et al. | 190/115 |
| 5,530,990 A | * | 7/1996 | Chen | 16/113.1 |
| 5,624,012 A | * | 4/1997 | Wang | 190/115 |
| 5,685,421 A | * | 11/1997 | Gilmore | 206/216 |
| 6,032,334 A | * | 3/2000 | Iima et al. | 16/405 |
| 7,072,177 B2 | | 7/2006 | Peng et al. | |
| 7,114,602 B2 | * | 10/2006 | Chen | 190/11 |
| 2005/0150733 A1 | * | 7/2005 | Chen | 190/115 |
| 2010/0020490 A1 | * | 1/2010 | Lin | 361/679.55 |

FOREIGN PATENT DOCUMENTS

| | | | |
|---|---|---|---|
| CH | 590028 A | * | 7/1977 |
| TW | M244715 | | 9/2004 |
| TW | M302726 | | 12/2006 |

OTHER PUBLICATIONS

Taiwan Patent Office, Office Action, Patent Application Serial No. 098118144, Nov. 29, 2011, Taiwan.

* cited by examiner

*Primary Examiner* — Victor Batson
*Assistant Examiner* — Emily Morgan

(57) ABSTRACT

An electronic device includes a handle structure and a housing. The housing has an opening. The handle structure is retractably disposed in the housing and includes an engaging module and a handle module. The engaging module includes a first engaging portion disposed on the housing. The handle module is movably connected to the housing and includes a main body, an elastic element and a second engaging portion. The elastic element provides an elastic force for the main body to move toward the opening. When the first engaging portion and the second engaging portion are disposed at an engaging portion, at least a portion of the main body is disposed in the housing. When the first engaging portion and the second engaging portion are disposed at a separating position, the main body protrudes from the housing.

6 Claims, 10 Drawing Sheets

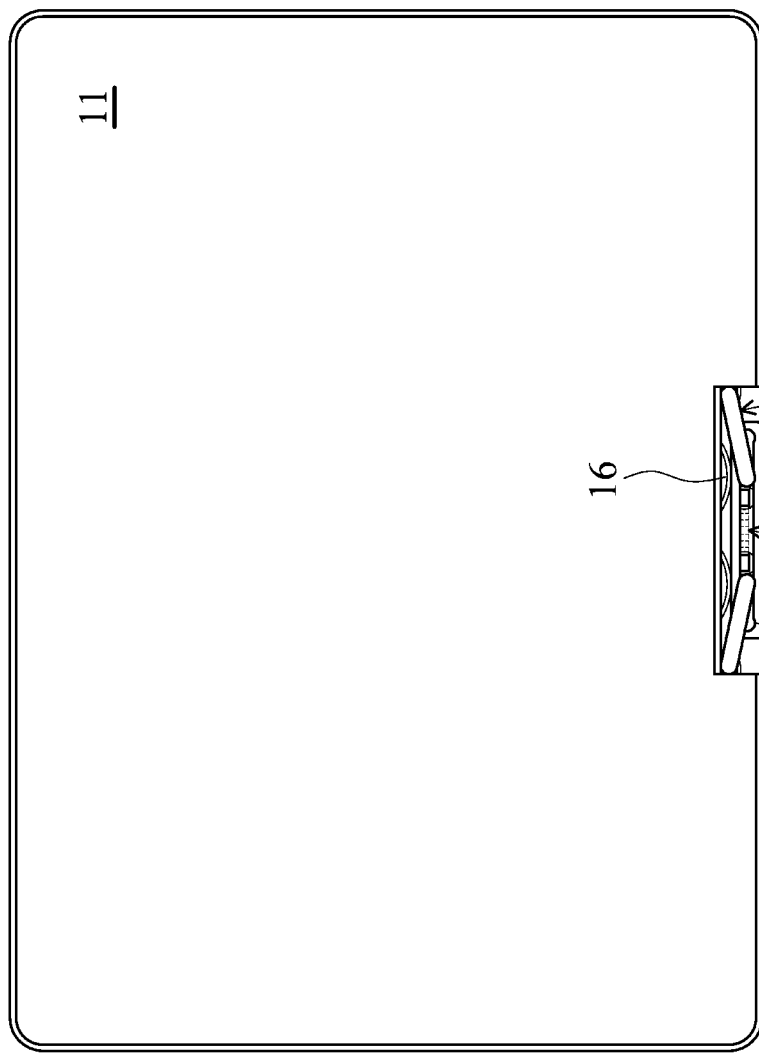

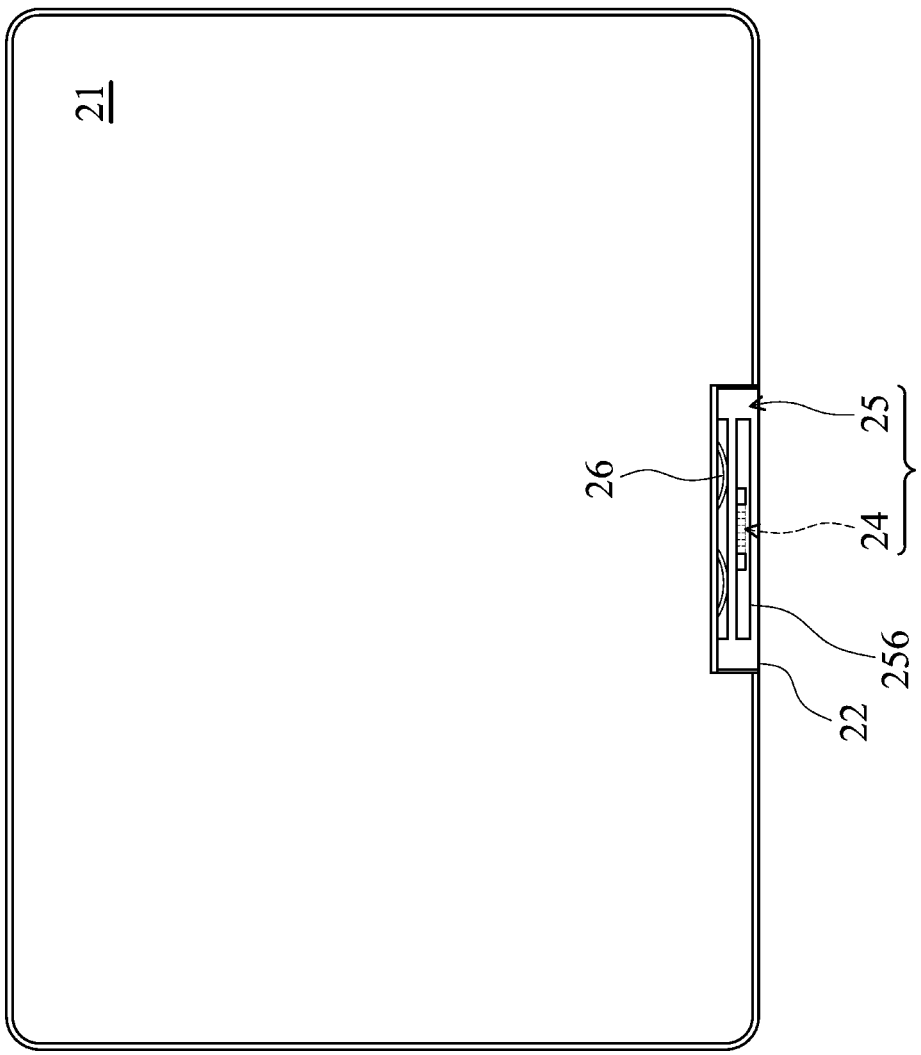

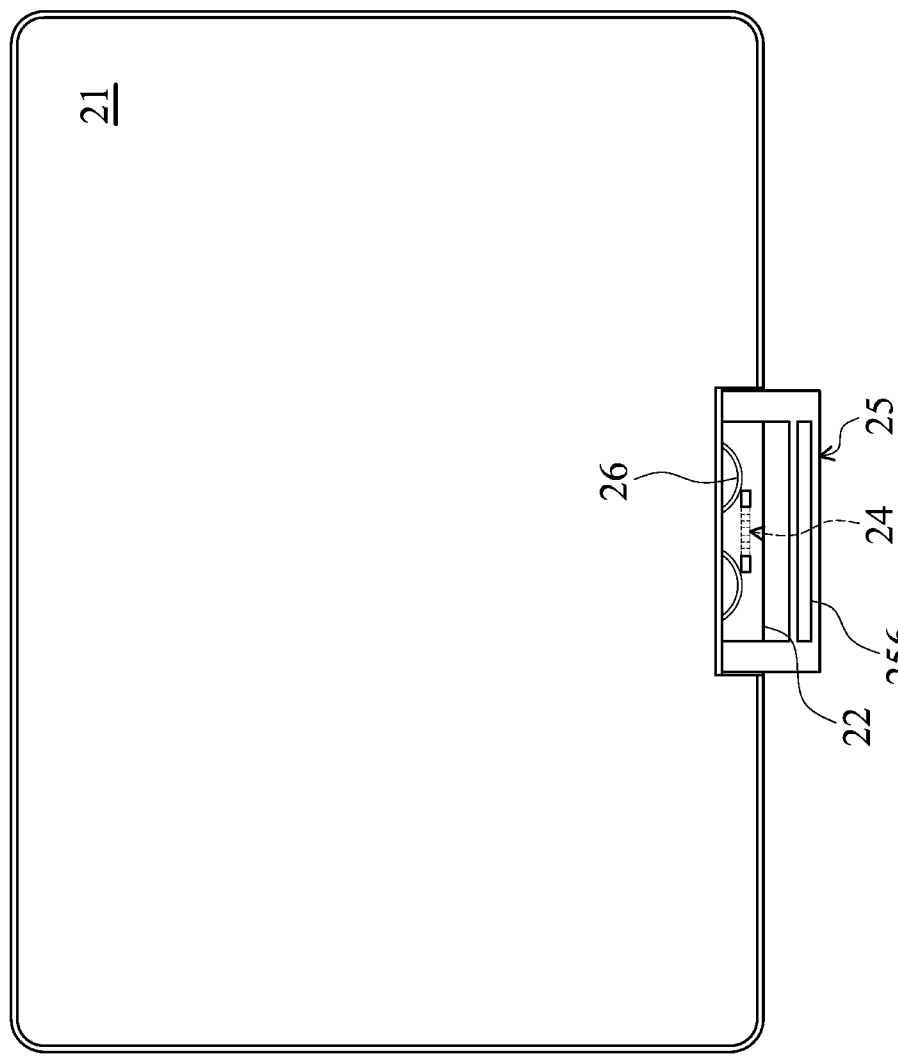

ELECTRONIC DEVICE AND HANDLE STRUCTURE THEREOF

CROSS REFERENCE TO RELATED APPLICATIONS

This Application claims priority of Taiwan Patent Application No. 098118144, filed on Jun. 2, 2009, the entirety of which is incorporated by reference herein.

BACKGROUND OF THE INVENTION

1. Field of the Invention

The invention relates to an electronic device, and more particularly to an electronic device with an elastic handle structure.

2. Description of the Related Art

Life and work of modern people pretty much depend on electronics device, for example a computer. Thus, it is usually to seen that the electronic devices are carried with people. A conventional electronic device may be heavy and not comprise a handle. Therefore, the conventional electronic device may require placement in a carrying case for carrying. This is inconvenient for users. Specifically, users are required to take the conventional electronic device, in and out of the carrying case for usage and storage. Meanwhile, if no carrying case is available, users must manually carry the conventional electronic device, which is inconvenient.

BRIEF SUMMARY OF THE INVENTION

The invention provides an electronic device including a handle structure and a housing. The housing has an opening. The handle structure is retractably disposed in the housing and includes an engaging module and a handle module. The engaging module includes a first engaging portion disposed on the housing. The handle module is movably connected to the housing and includes a main body, an elastic element and a second engaging portion. The elastic element provides an elastic force for the main body to move toward the opening. When the first engaging portion and the second engaging portion are disposed at an engaging position, at least a portion of the main body is disposed in the housing. When the first engaging portion and the second engaging portion are disposed at a separating position, the main body is sprung to protrude from the housing via the elastic element.

Note that the engaging module further comprises a pressed portion and a flexible portion, the pressed portion is connected to the flexible portion, the flexible portion is connected to the first engaging portion, and when the pressed portion is pressed downward, the flexible portion deforms to make the first engaging portion move to the separating position.

Note that the flexible module further comprises a first end and a second end, the first end props against the housing and is connected to the first engaging portion, and the second end is connected to the pressed portion.

Note that the flexible portion is stage-shaped.

Note that the first engaging portion is a hook.

Note that the main body comprises a first linking bar, a second linking bar, and a third linking bar, the first linking bar and the second linking bar are rotatably connected to the housing, and the third linking bar is connected to the first linking bar and the second linking bar.

Note that the third linking bar comprises a groove, and the first linking bar and the second linking bar move in the groove.

Note that the first engaging portion enters the groove and engages with the second engaging portion, and the second engaging portion is an inner wall of the groove.

Note that the first engaging portion is movably connected to the housing.

Note that the elastic element is a spring.

Note that the elastic element is an elastic sheet.

Note that the handle module is a single and unitary member.

Note that the handle module is a single and unitary member and U-shaped.

The invention provides an electronic device comprising an upper cover and a main body. The upper cover comprises a sliding portion and a spring. The spring and the sliding portion are fixed to the upper cover, and the spring comprises an engaging portion and two ends. The engaging portion and the end form an included angle. The main body comprises a track. The track comprises a first wedging portion and two second wedging portions. The sliding portion is connected to the track and slides corresponding to the track. The first wedging portion is disposed on the central portion of the side of the track. The second wedging portions are respectively disposed on the two ends of the side of the track. When the sliding portion slides corresponding to the track, the engaging portion engages with one of the first wedging portion and the second wedging portions.

Note that the main body further comprises an input device.

Note that the upper cover further comprises a screen.

BRIEF DESCRIPTION OF DRAWINGS

The invention can be more fully understood by reading the subsequent detailed description and examples with references made to the accompanying drawings, wherein:

FIG. 2A is a vertical view showing a handle structure of an electronic device of the invention in a closed state;

FIG. 8 is a vertical view showing a handle structure of an electronic device of another embodiment of the invention in a closed state; and FIG. 9 is a vertical view showing a handle structure of an electronic device of another embodiment of the invention in an opened state.

The invention can be more fully understood by reading the subsequent detailed description and examples with references made to the accompanying drawings.

DETAILED DESCRIPTION OF THE INVENTION

Figure 1:
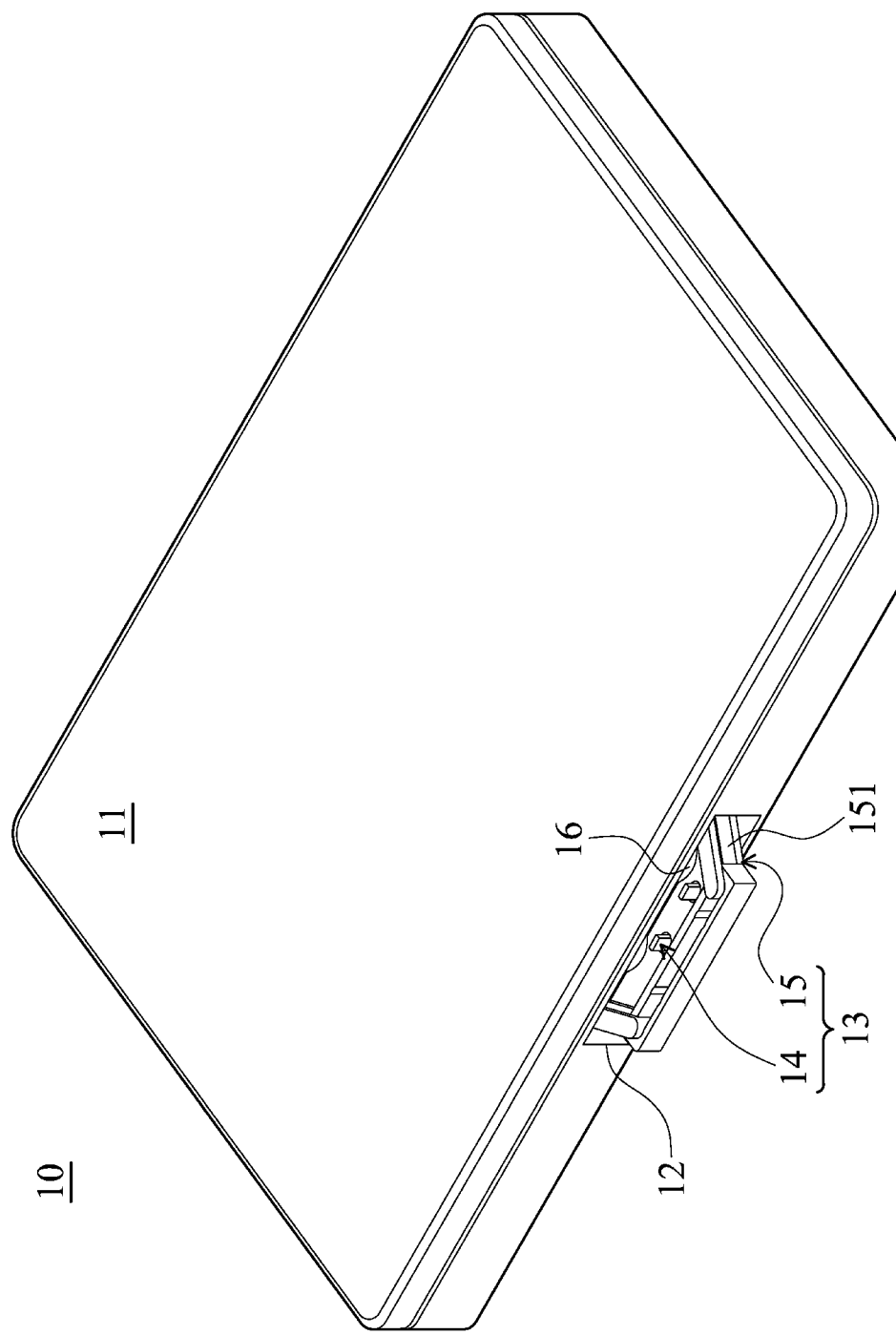
FIG. 1 is a schematic view of an electronic device of the invention.

FIG. 1 is a schematic view of an electronic device of the invention. FIG. 2A is a vertical view showing a handle structure of an electronic device of the invention in a closed state.

Figure 2B:
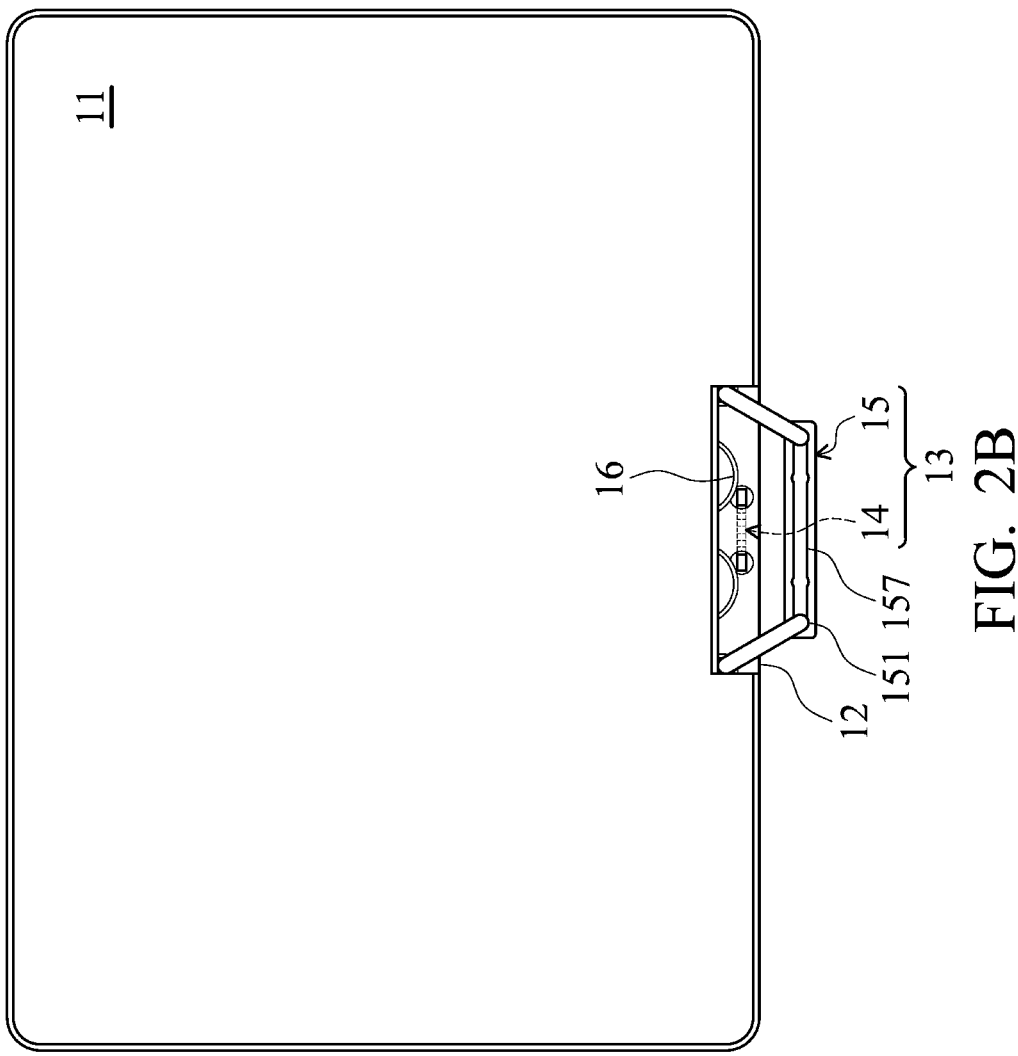
FIG. 2B is a vertical view showing a handle structure of an electronic device of the invention in an opened state.
Figure 3:
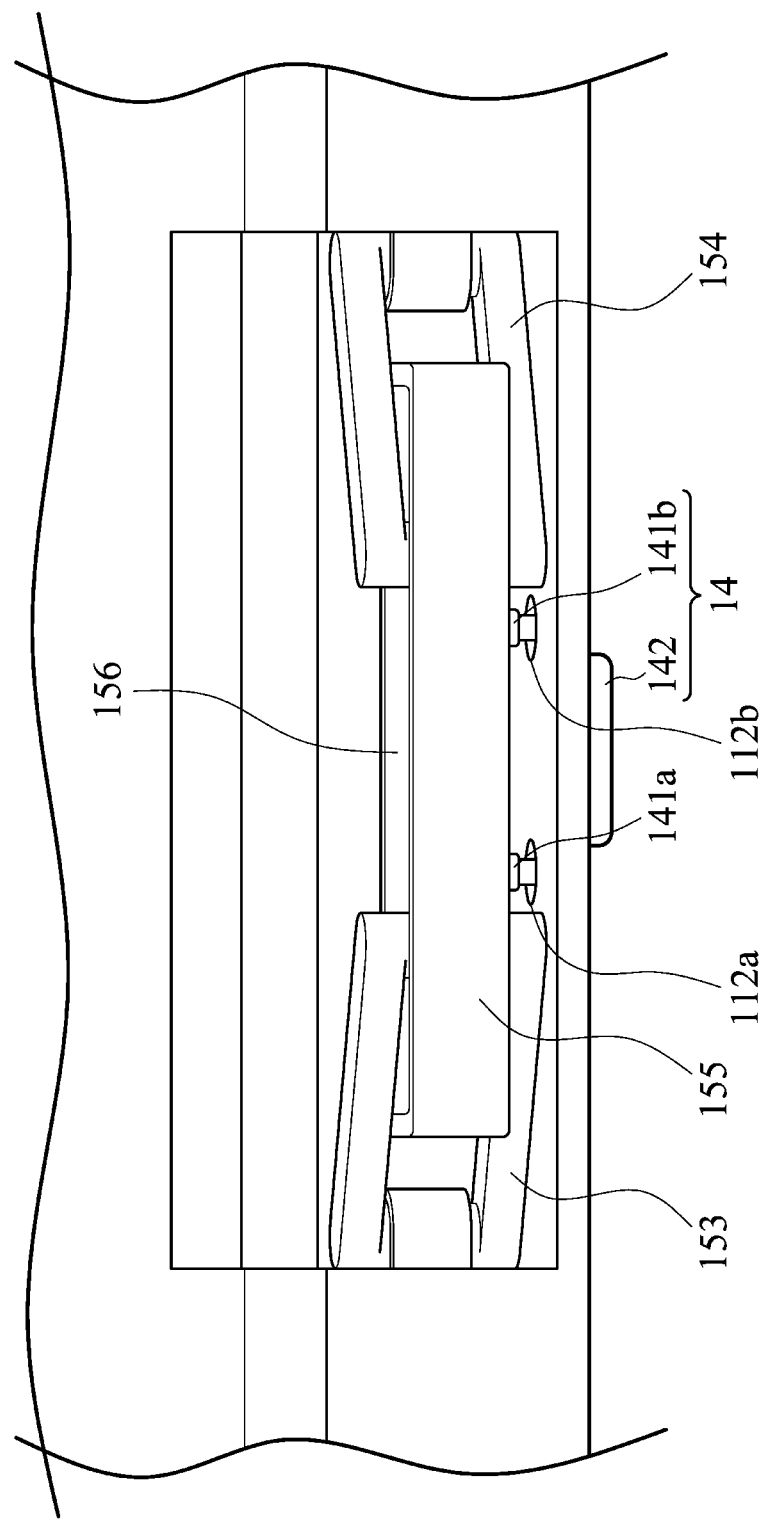
FIG. 3 is a schematic view of a handle structure of an electronic device of the invention.

FIG. 2B is a vertical view showing a handle structure of an electronic device of the invention in an opened state. FIG. 3 is a schematic view of a handle structure of an electronic device of the invention.

Referring to FIGS. 1-3, the electronic device 10 includes a handle structure 13 and a housing 11. The housing has an opening 12. In this embodiment, the electronic device is a notebook computer, and the opening 12 and the handle structure 13 are disposed on the side of the notebook computer. Via the design of the handle structure 13, the notebook computer is more convenient to carry. Note that when the handle structure 13 is hidden in the housing 11 (shown in FIG. 2A), the handle structure 13 is fully pressed in the housing 11. However, in other embodiments, when the handle structure 13 is hidden in the housing 11, the handle structure 13 is partially pressed in the housing 11. That is, at least of the handle structure 13 is pressed in the housing 11.

The handle structure 13 is retractably disposed in the housing and springs from the opening 12. The handle structure 13 includes an engaging module 14, a handle module 15 and an elastic element 16. The engaging module 14 includes two first engaging portions 141a and 141b. Because a pressed portion 142 is connected to the first engaging portions 141a and 141b, when the pressed portion 142 is pressed, the first engaging portions 141a and 141b move. The first engaging portions 141a and 141b protrude from the inner of the housing 11. The handle module 15 is movably connected to the housing 11 and includes a main body 151, and a second engaging portion 157. The elastic element 16 is disposed toward the opening 12 to spring out of the main body 151. As shown in FIGS. 2A, 2B and 3, when the first engaging portions 141a and 141b and the second engaging portion 157 are disposed at an engaging position (the position in FIG. 2A), the main body 151 is hidden in the housing 11. When the first engaging portions 141a and 141b and the second engaging portion 157 are disposed at a separating position (the position in FIG. 2B), the main body 151 is sprung to protrude from the housing 11 via the elastic element 16. Note that the elastic element 16 is an elastic sheet in this embodiment.

Figure 4:
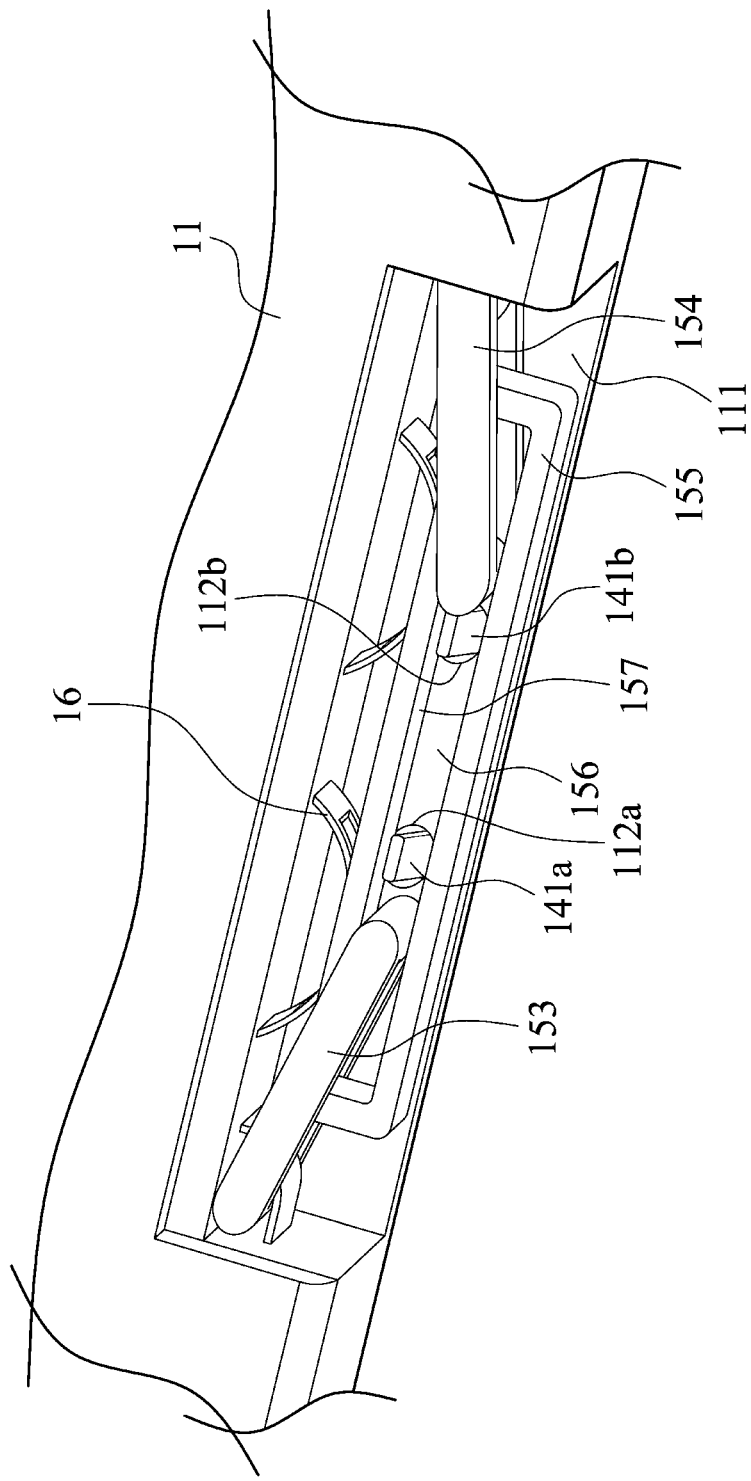
FIG. 4 is a schematic view of a handle structure of an electronic device of the invention.
Figure 5:
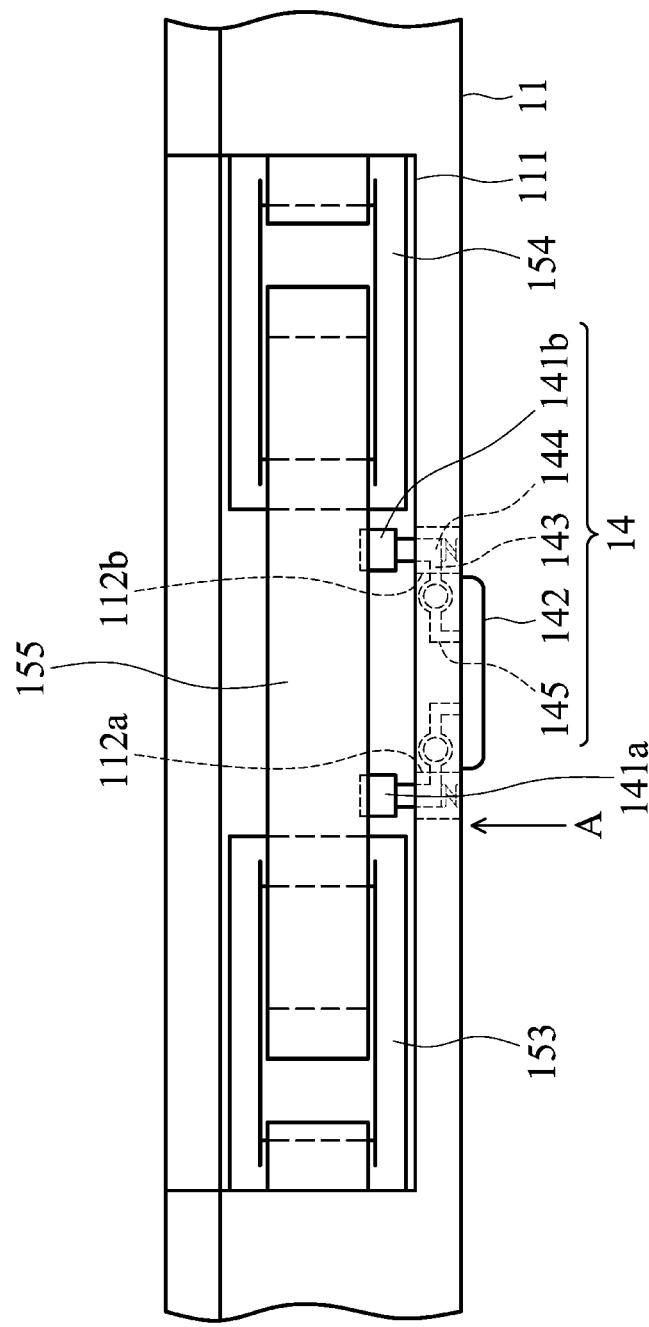
FIG. 5 is a schematic view showing a first engaging portion and a second engaging portion of the handle structure of the invention disposed at an engaging position.
Figure 6:
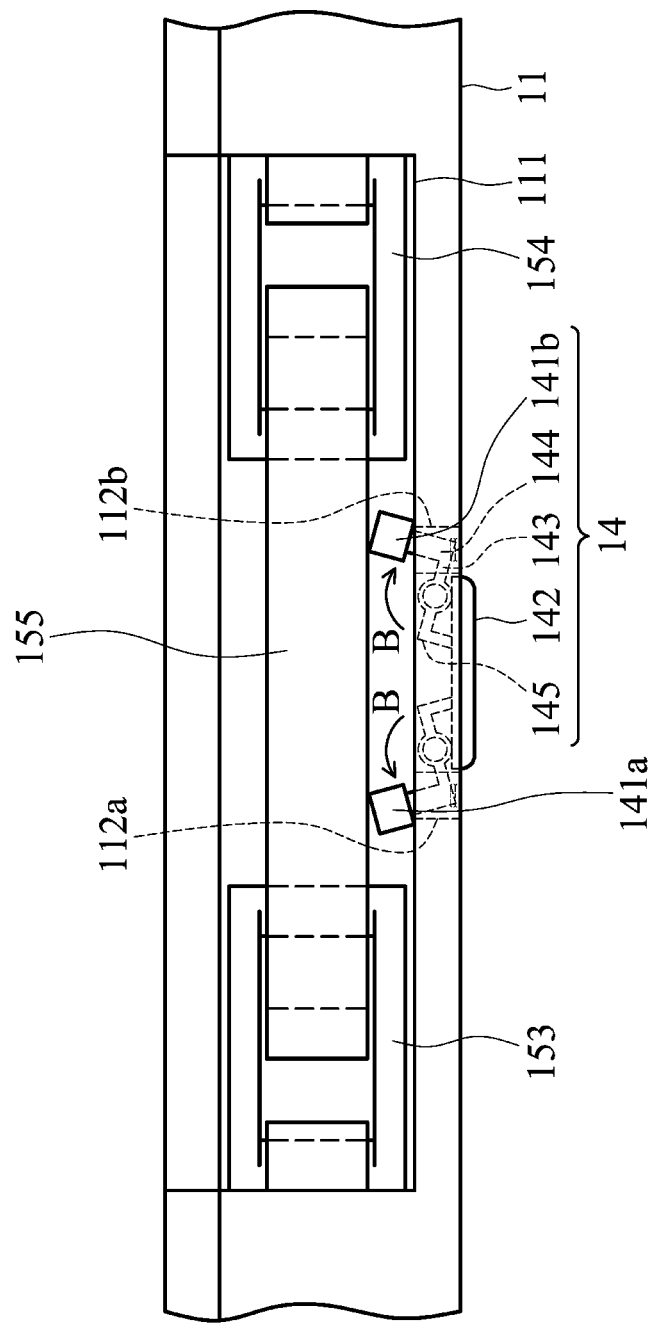
FIG. 6 is a schematic view showing a first engaging portion and a second engaging portion of the handle structure of the invention disposed at a separating position.

FIG. 4 is a schematic view of a handle structure of an electronic device of the invention. FIG. 5 is a schematic view showing a first engaging portion and a second engaging portion of the handle structure of the invention disposed at an engaging position. FIG. 6 is a schematic view showing a first engaging portion and a second engaging portion of the handle structure of the invention disposed at a separating position.

Referring to FIGS. 2A and 4, the housing 11 comprises a bottom surface 111. The bottom surface 111 has holes 112a and 112b to make the first engaging portions 141 a and 141b stretch from the holes 112a and 112b. The holes 112a and 112b is greater than the first engaging portions 141a and 141b so that the first engaging portions 141a and 141b may move in the holes 112a and 112b. The main body 151 of the handle module 15 is a movable linking mechanic. The main body 151 comprises a first linking bar 153, a second linking bar 154, and a third linking bar 155. The first linking bar 153 and the second linking bar 154 are rotatably connected to the housing 11. The third linking bar 155 is connected to the first linking bar 153 and the second linking bar 154 and comprises a groove 156 to make the second linking bar 154 move in the groove 156. Thus, when the main body 151 is hidden in the housing 11, the first linking bar 153 and the second linking bar 154 in the groove 156 move toward the middle section to narrow the main body 151. Thus, the main body 151 is folded to hide in the housing 11.

Referring to FIGS. 4-6, the engaging module 14 further comprises a pressed portion 142 and a flexible portion 143. The pressed portion 142 is connected to the flexible portion 143. The flexible portion 143 is connected to the first engaging portions 141a and 141b. The flexible portion 143 further comprises a first end 144 and a second end 145. The first end 144 props against the housing 11 and is connected to the first engaging portions 141a and 141b. The second end 145 is connected to the pressed portion 142.

FIG. 5 shows that the first engaging portions 141a and 141b and the second engaging portion 157 are at the engaging position. At this time, the first engaging portions 141a and 141b pass through the groove 156 of the third linking bar 155 to lodge in the second engaging portion 157, thus, the second engaging portion 157 is not sprung via the elastic element 16. In this embodiment, the second engaging portion 57 is the inner wall of the groove 157.

When the pressed portion 142 is pressed along an arrow A of FIG. 5, the flexible portion 143 deforms according to the lever principle shown in FIG. 6. When the pressed portion 142 is exerted a pressure, the second end 145 is pressed to move to make the second end 145 become inclined corresponding to the first end 144. When the first engaging portions 141a and 141b in the holes 112a and 112b moves along an arrow B of the FIG. 6, the first engaging portions 141a and 141b depart from the groove 156 of the third linking bar 155 (shown in FIG. 3). Thus, the first engaging portions 141a and 141b and the second engaging portion 157 are disposed at the separating position. Referring to FIGS. 2B and 4, because the first engaging portions 141a and 141b and the second engaging portion 157 are disposed at the separating position, the first engaging portions 141a and 141b are not lodged by the second engaging portion 157. Thus, the third linking bar 155 is sprung out toward the opening 12 via the elastic force generated by the elastic element 16. In this embodiment, the flexible portion 143 is stage-shaped.

Note that because the engaging module 14 has a flexible portion 143, the engaging module 14 restores to an initial state (the state in FIG. 5) after moving the force on the pressed portion 142. When a user puts the handle module 15 back in the housing 11, the handle module 15 is exerted a force toward the housing 11. The handle module 15 is folded to enter the housing 11 and push away the engaging module 14. When the first engaging portions 141a and 141b enter the groove 156, the first engaging portions 141a and 141b are once again engaged with the second engaging portion 157. At this time, the connection between the handle structure 13 and the housing 11 restores back to the state shown in FIG. 2A.

Figure 7:
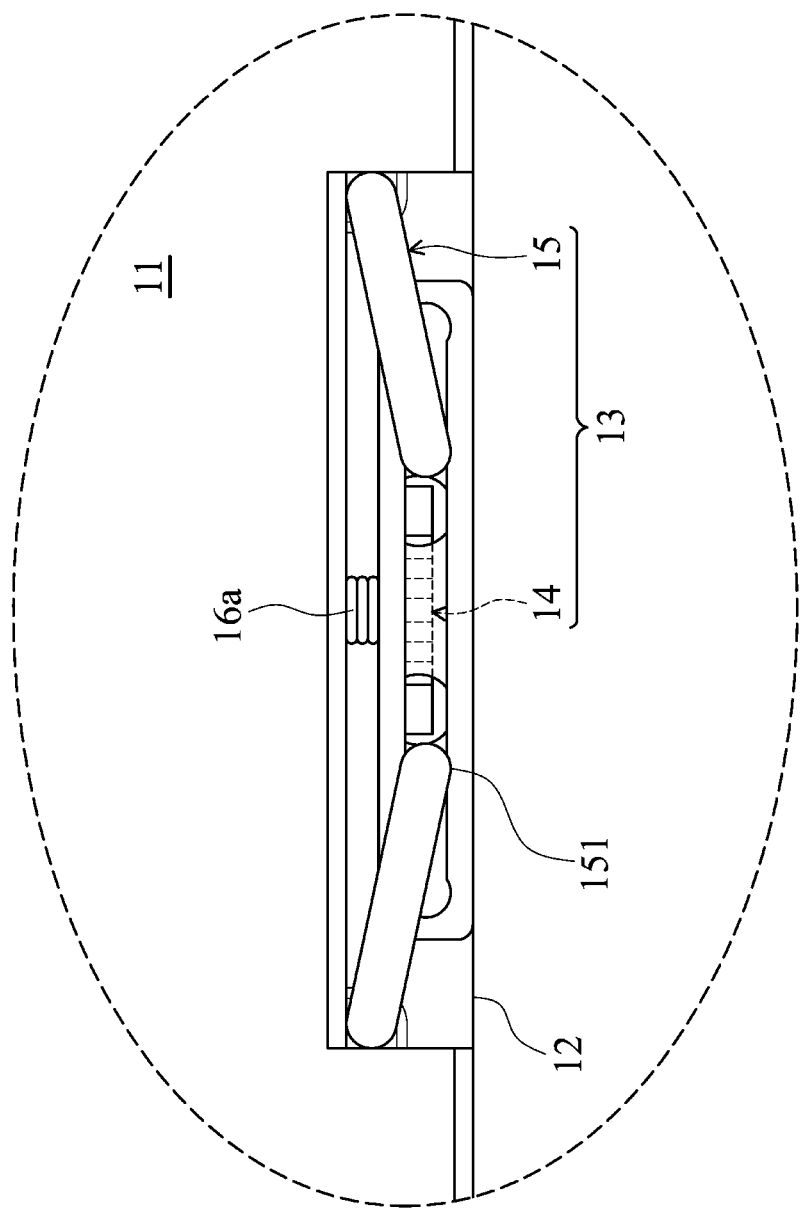
FIG. 7 is a schematic view of a handle structure of another embodiment of the invention.

FIG. 7 is a schematic view of a handle structure of another embodiment of the invention. This embodiment is similar to that of FIG. 1. The difference is that the elastic element 16a is a spring.

FIG. 8 is a vertical view showing a handle structure of an electronic device of another embodiment of the invention in a closed state. FIG. 9 is a vertical view showing a handle structure of an electronic device of another embodiment of the invention in an opened state.

Referring to FIGS. 8-9, this embodiment is similar to that of FIG. 1. The difference is that the handle module 25 is a single and unitary member. In this embodiment, the handle module 25 is U-shaped and includes a groove 256 to make the engaging module 24 limit movement of the handle module 25.

In summary, the handle structure of the electronic device of the invention provides a user with better carrying convenience.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
   a housing, having a recess comprising an opening, a bottom surface opposite to the opening, and a sidewall; and
   a handle structure, wherein the handle structure comprises:
   an engaging module, comprising a first engaging portion disposed on a sidewall of the recess; and
   a handle module, movably connected to the housing and comprising a main body and a second engaging portion; and
   an elastic element, disposed in the recess;
   wherein when the first engaging portion and the second engaging portion are disposed at an engaging position, the main body is held in a first position in the recess adjacent to the bottom surface, and when the first engaging portion and the second engaging portion are disposed at a separating position, the main body moves away from the bottom surface to a second position protruding from the recess via the opening,
   wherein the main body comprises a first linking bar, a second linking bar, and a third linking bar, and the first linking bar and the second linking bar are rotatably connected to the housing,
   wherein the third linking bar comprises a groove facing the sidewall, and the first linking bar and the second linking bar are connected to the third linking bar and moveable in the groove,
   wherein the first engaging portion enters the groove from the sidewall and engages with the second engaging portion when in the engaging position, and the second engaging portion is an inner wall of the groove,
   wherein the engaging module further comprises a pressed portion and a flexible portion, and the pressed portion is connected to the flexible portion, the flexible portion is connected to the first engaging portion, and when the pressed portion is pressed, the flexible portion is pivoted to make the first engaging portion move to the separating position, and
   wherein the flexible portion pivots around a pivoting axis, and the pivoting axis is perpendicular to a length direction of the third linking bar.

2. The electronic device as claimed in claim 1, wherein the flexible portion further comprises a first end and a second end, the first end is connected to the first engaging portion, and the second end is connected to the pressed portion.

3. The electronic device as claimed in claim 1, wherein the flexible portion is flat.

4. The electronic device as claimed in claim 1, wherein the first engaging portion is movably connected to the housing.

5. The electronic device as claimed in claim 1, wherein the elastic element is a spring.

6. The electronic device as claimed in claim 1, wherein the elastic element is an elastic sheet.

* * * * *